United States Patent Office 3,272,717
Patented Sept. 13, 1966

3,272,717
PROCESS FOR PREPARING THERMALLY STABLE AMYLASE COMPOSITION
Juichiro Fukumoto, 4–227 Kirihata, Aza-Nagoyama, Takarazuka, Japan, and Hideo Negoro, 549–38 Tarumi, Suita, Japan
No Drawing. Filed Jan. 27, 1964, Ser. No. 340,549
Claims priority, application Japan, Jan. 26, 1963, 38/3,827
2 Claims. (Cl. 195—68)

This invention relates to a process for preparing a thermally stable amylase composition of the bacterial starch-liquefying type.

Bacterial starch-liquefying amylase is generally characterized by its relatively high stability to heat, as compared to amylases of other sources. But, its thermal stability is still unsatisfactory. Said amylase is not sufficiently stable as to remain stable at a temperature higher than 90° C. Such a temperature may be encountered, for example, in liquefying starch for the production of glucose, and in desizing starchy materials in the textile industry. Accordingly, it is commercially important to increase the thermal stability of said amylase as high as possible.

We have found that certain cationic surface active agents may combine with said amylase so as to improve the thermal stability of said amylases.

In a preferred embodiment of our invention one part of a dilute solution containing about 1–2% of cationic surface active agent is mixed with about ten parts of culture filtrate of a strain of Bacillus subtilis, which contains about 1,500 Lintner Sollied units of starch-liquefying amylase. This procedure may be carried out at room temperature at a pH of 6.0–6.5. By this treatment, amylase and the surface active agent form a complex which is more stable on heating than the original amylase.

The thus formed complex maintains substantially the same enzymic activities and shows the same enzymic actions as untreated amylase. Because of these facts, it is presumed that the active site of amylase protein is not changed by this treatment. The stabilization of amylase may be due to the modification of the structure in its carrier part of enzyme protein. (Known as "träger part.") This modification may be caused by the ionic combination between the surface active agent and the statically chargeable moiety of the enzyme other than its active site. It may be also due to the formation of a high dimensional structure which is formed by the interaction of the non polar, long-chain part of the surface active agent and the non polar residuals of the amino acid of the enzyme.

Most of the contaminants, except protease, existing in the culture filtrate, coagulate or precipitate by this treatment. They are filtered off, so that the remaining solution contains an amylase complex and protease. Commercially available cationic surface active agents, such as benzalkonium chloride (chemical name: alkyl-dimethyl-benzyl-ammonium chloride) or methyl-benzethonium chloride (chemical name: benzyl-dimethyl-{2-[2-(p-1,1,3,3-tetramethylbutyl-cresoxy) - ethoxy] - ethyl}-ammonium chloride), are preferably used for this purpose. It is preferable to use the surface active agent in an amount of 0.1–0.2% as the final concentration.

The thus formed amylase complex is isolated from this solution by mixing 30–35% by weight of isopropanol and about 15% by weight of starch, and filtering the precipitated adsorbate at low temperature, preferably lower than 10° C., and drying it. For this purpose, 1 g. of corn, wheat or rice starch is preferably used to about 5,000 units of amylase. (1 g. of pure bacterial starch-liquefying amylase is equivalent to about 1,000,000 L.S. units.) Isopropanol can be replaced by other water-miscible organic solvents such as ethanol, acetone, etc.

The thus isolated amylase composition contains 4–8% of cationic surface active agent and about 5,000 units per gram of starch-liquefying amylase. Its thermal stability is illustrated later.

This treatment produces another advantage that protease may be recovered from the culture filtrate at the same time. Protease is recovered easily from the filtrate from which the amylase adsorbate was separated, by raising the concentration of said organic solvent in the filtrate, and filtering the precipitate. The concentration of said organic solvent sufficient to precipitate protease is 70–75% when isopropanol is the solvent.

The stabilization method described above is generally applicable to bacterial starch-liquefying amylases, which are produced by mesophilic, aerobic bacteria which have similar properties to the amylase production. This stabilization method is also applicable to other liquids which contain starch-liquefying amylase, such as a solution of dissolved amylase which is prepared in the usual manner.

EXAMPLE

A strain of Bacillus subtilis is submergedly cultured for 20 hours at 37° C., in an aqueous nutrition medium having a pH of 7.0 which contains 5% soybean cake, 3% starch and 1% ammonium phosphate. The culture medium is filtered. The filtrate was assayed as containing 1,500 units of amylase and 600 units of protease per ml. (Protease unit is represented by G.V.R. unit.)

One part of a 1% aqueous solution of benzalkonium chloride is mixed with 10 parts of the filtrate at room temperature at pH 6. The mixture is filtered to remove coagulated contaminants, and 6 parts by weight of isopropanol is added to the filtrate. (Final concentration is about 35%.) Then, the filtrate is cooled to a temperature lower than 10° C. and 15% by weight of corn starch is added, and stirred. The precipitated amylase composition is collected by filtration, and dried. The amylase composition was assayed as containing about 5,000 units/g. of starch-liquefying amylase. Yield: 89% of theory.

The thermal stability of this composition is illustrated as sample C in the following experiment. From the filtrate, from which the amylase composition was separated, protease is recovered in 70% yield by adding isopropanol until the final concentration reaches 70%.

EXPERIMENT

Four enzymic samples were prepared by the methods stated below. Each sample was diluted to produce an aqueous solution containing 50 units/ml. of starch-liquefying amylase. The solutions were adjusted to pH 6.0 with an acetic acid buffer solution. The solutions were heated at temperatures for periods as shown in Table 1. The results are illustrated in Table 1.

Table 1

[Remaining percentages of amylase activities]

| Temperature, °C | 70 | 70 | 70 | 80 | 85 | 90 |
|---|---|---|---|---|---|---|
| Heating time (minutes) | 30 | 60 | 120 | 10 | 10 | 10 |
| Sample: | | | | | | |
| A | | 65 | 45 | | | |
| B | | 80 | 65 | | | |
| C | | 97 | 94 | 87 | 60 | 15 |
| D | 6 | 0 | 0 | 4 | 0 | 0 |

Enzymic samples:
(A) Culture filtrate of a strain of *Bacillus subtilis*.
(B) Filtrate prepared by filtration of (A) after addition of 0.2% benzalkonium chloride.
(C) Amylase composition adsorbed on corn starch with (B) after addition of 35% isopropanol and 15% of corn starch. (The product of example.)
(D) Enzymic composition adsorbed on starch with culture filtrate of the bacteria used in (A) in the presence of ammonium sulfate.

Unit of amylase activity:
The amylase unit is defined as the enzymic capacity which is necessary to liquefy 1 g. of starch in 10 g. of water at pH 6.0 for 15 minutes at 65° C. (Lintner Sollied unit.)

What we claim is:
1. A process for preparing thermally stable amylase composition, which comprises mixing starch-liquefying amylase produced by a strain of mesophilic, aerobic bacteria, with a cationic surface active agent in an aqueous medium at a pH of 6.0–6.5, filtering the treated mixture, adding an organic solvent and starch successively to the thus-formed amylase complex contained in the filtrate, filtering the precipitate, and drying it.

2. A process according to claim 1, wherein said cationic surface active agent is a member selected from the group consisting of benzalkonium chloride and methyl-benzethonium chloride.

References Cited by the Examiner
UNITED STATES PATENTS
2,848,371  8/1958  Yoshida _____ 195—62

OTHER REFERENCES
Negoro et al.: Chemical Abstracts 52, 1313g (1958).
Negoro et al.: Chemical Abstracts 55, 12483g (1961).

A. LOUIS MONACELL, *Primary Examiner.*

L. M. SHAPIRO, *Assistant Examiner.*